United States Patent
Cricri

(10) Patent No.: US 9,946,957 B2
(45) Date of Patent: Apr. 17, 2018

(54) METHOD, APPARATUS, COMPUTER PROGRAM AND SYSTEM FOR IMAGE ANALYSIS

(71) Applicant: Nokia Technologies Oy, Espoo (FI)

(72) Inventor: Francesco Cricri, Tampere, FL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/185,550

(22) Filed: Jun. 17, 2016

(65) Prior Publication Data

US 2016/0379089 A1   Dec. 29, 2016

(30) Foreign Application Priority Data

Jun. 29, 2015 (GB) .................................. 1511334.3

(51) Int. Cl.
*G06K 9/62* (2006.01)
*G06K 9/32* (2006.01)
*G06K 9/46* (2006.01)

(52) U.S. Cl.
CPC ......... *G06K 9/6218* (2013.01); *G06K 9/3275* (2013.01); *G06K 9/4604* (2013.01);
(Continued)

(58) Field of Classification Search
CPC ............. G06K 9/4604; G06K 9/00288; G06K 9/4671; G06K 9/527; G06K 9/6218; G06K 9/6267; G06K 9/32; G06K 9/3275; G06K 9/4676; G06K 9/6255; G06K 9/629; G06K 9/00295; G06K 9/00369; G06K 9/6221; G06K 9/00342; G06K 9/00624; G06K 9/38; G06K 9/6297; G06K 9/2018; G06K 2009/00932; G06K 9/00228;
(Continued)

(56) References Cited

U.S. PATENT DOCUMENTS 6,185,314 B1 * 2/2001 Crabtree ............... G01S 3/7865
348/169
6,253,218 B1 * 6/2001 Aoki .................. G06F 17/30126
707/999.007
(Continued)

FOREIGN PATENT DOCUMENTS

WO        2014/015889 A1      1/2014

OTHER PUBLICATIONS

Lazebnik et al., "Beyond Bags of Features: Spatial Pyramid Matching for Recognizing Natural Scene Categories", IEEE Computer Society Conference on Computer Vision and Pattern Recognition, vol. 2, 2006, 8 pages.
(Continued)

*Primary Examiner* — Aklilu Woldemariam
(74) *Attorney, Agent, or Firm* — Alston & Bird LLP

(57) ABSTRACT

Examples of the present disclosure relate to a method, apparatus, computer program and system for image analysis. According to certain examples, there is provided method comprising causing, at least in part, actions that result in: receiving orientation information of an image capturing device; receiving one or more features detected from an image captured by the image capturing device; and selecting a clustering model for clustering the features, wherein the clustering model is selected, at least in part, in dependence upon the orientation information.

20 Claims, 6 Drawing Sheets

(52) U.S. Cl.
CPC ............. *G06K 9/4676* (2013.01); *G06K 9/62* (2013.01); *G06K 9/629* (2013.01); *G06K 9/6255* (2013.01); *G06K 9/6267* (2013.01)

(58) Field of Classification Search
CPC ....... G06K 9/00604; G06T 7/11; G06T 7/162; G06T 2207/10016; G06T 17/00; G06T 2207/30168; G06T 9/001; G06T 7/246; G06T 7/277; G06T 15/04; G06T 17/10; G06T 2207/10028; G06T 2207/30196; G06T 7/75; G06T 7/215; G06T 2207/10081; G06T 2207/20004; G06T 2207/20076; G06T 2207/20081; G06T 2207/20182; G06T 2207/20208; G06T 2207/30084; G08B 13/19604; G08B 13/19602; G08B 13/1961; G08B 13/19645; H04N 2101/00; H04N 5/23238; H04N 7/181; G06F 17/30244; G06F 17/30247; G06F 17/30268; A61B 5/02007; A61B 5/1128; A61B 5/117; A61B 5/1171
USPC ....... 382/103, 159, 197, 225, 253, 107, 173, 382/220, 236; 348/169, 699, 700
See application file for complete search history.

(56) References Cited

U.S. PATENT DOCUMENTS

| | | | | |
|---|---|---|---|---|
| 6,263,088 B1* | 7/2001 | Crabtree | ............... | G01S 3/7865 348/169 |
| 6,841,780 B2* | 1/2005 | Cofer | ..................... | G01B 11/25 250/341.1 |
| 6,999,613 B2* | 2/2006 | Colmenarez | ......... | G06K 9/6297 348/153 |
| 7,027,619 B2* | 4/2006 | Pavlidis | .............. | G06K 9/00228 382/115 |
| 7,058,209 B2* | 6/2006 | Chen | .................. | G06K 9/00281 382/117 |
| 8,094,881 B2* | 1/2012 | Matsugu | ............ | G06K 9/00342 348/152 |
| 9,443,314 B1* | 9/2016 | Huang | ....................... | G06T 7/11 |
| 9,679,226 B1* | 6/2017 | Huang | .................. | G06K 9/627 |
| 2003/0147558 A1* | 8/2003 | Loui | ................. | G06K 9/00624 382/225 |
| 2007/0273765 A1* | 11/2007 | Wang | ................. | G06K 9/00771 348/152 |
| 2008/0304743 A1* | 12/2008 | Tang | ..................... | G06K 9/342 382/173 |
| 2009/0279790 A1* | 11/2009 | Burge | .................. | G06K 9/00604 382/209 |
| 2012/0076401 A1 | 3/2012 | Sanchez et al. | | |
| 2012/0218427 A1* | 8/2012 | Wu | .................... | H04N 5/23254 348/208.6 |
| 2012/0219174 A1* | 8/2012 | Wu | .................... | G06K 9/00711 382/103 |
| 2013/0273968 A1* | 10/2013 | Rhoads | ............. | G06F 17/30244 455/556.1 |
| 2014/0016832 A1* | 1/2014 | Kong | .................. | A61B 5/1171 382/115 |

OTHER PUBLICATIONS

Cricri et al., "Sport Type Classification of Mobile Videos", IEEE Transactions on Multimedia, vol. 16, No. 4, Jun. 2014, pp. 917-932.
Cricri et al., "Multimodal Extraction of Events and of Information About the Recording Activity in User Generated Videos", Multimedia Tools and Applications, vol. 70, No. 1, May 2014, pp. 119-158.
Extended European Search Report received for corresponding European Patent Application No. 16174678.9, dated Dec. 14, 2016, 6 pages.
Zhang et al., "Laplacian dime sparse coding with tilt and orientation consistency for image classification", Journal of Visual Communication and Image Representation, vol. 24, No. 7, Oct. 7, 2013, pp. 786-793.

* cited by examiner

METHOD, APPARATUS, COMPUTER PROGRAM AND SYSTEM FOR IMAGE ANALYSIS

TECHNOLOGICAL FIELD

Examples of the present disclosure relate to a method, apparatus, computer program and system for image analysis. Some examples, though without prejudice to the foregoing, relate to a method, apparatus, computer program and system for use in determining semantic information from an image for classifying the image.

BACKGROUND

In the field of computer vision, conventional methods and systems used in image/video analysis and multimodal analysis for determining semantic information from an image for classifying the image are not always optimal and may be computationally intensive.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to various but not necessarily all examples of the disclosure there is provided a method comprising causing, at least in part, actions that result in:
receiving orientation information of an image capturing device;
receiving one or more features detected from an image captured by the image capturing device; and
selecting a clustering model for clustering the features, wherein the clustering model is selected, at least in part, in dependence upon the orientation information.

According to various but not necessarily all examples of the disclosure there is provided an apparatus comprising:
means configured to receive orientation information of an image capturing device;
means configured to receive one or more features detected from an image captured by the image capturing device; and
means configured to select a clustering model for clustering the features, wherein the clustering model is selected, at least in part, in dependence upon the orientation information.

According to various but not necessarily all examples of the disclosure there is provided an apparatus comprising: at least one processor; and
at least one memory including computer program code;
the at least one memory and the computer program code configured to, with the at least one processor, cause the apparatus at least to perform:
receiving orientation information of an image capturing device;
receiving one or more features detected from an image captured by the image capturing device; and
selecting a clustering model for clustering the features, wherein the clustering model is selected, at least in part, in dependence upon the orientation information.

According to various but not necessarily all examples of the disclosure there is provided a computer program that, when performed by at least one processor, causes least the following to be performed:
receiving orientation information of an image capturing device;
receiving one or more features detected from an image captured by the image capturing device; and
selecting a clustering model for clustering the features, wherein the clustering model is selected, at least in part, in dependence upon the orientation information.

According to various but not necessarily all examples of the disclosure there is provided a non-transitory computer readable medium encoded with instructions that, when performed by at least one processor, causes at least the following to be performed:
receiving orientation information of an image capturing device;
receiving one or more features detected from an image captured by the image capturing device; and
selecting a clustering model for clustering the features, wherein the clustering model is selected, at least in part, in dependence upon the orientation information.

According to various but not necessarily all examples of the disclosure there is provided a device, a chipset or a module comprising processing circuitry configured to:
receive orientation information of an image capturing device;
receive one or more features detected from an image captured by the image capturing device; and
select a clustering model for clustering the features, wherein the clustering model is selected, at least in part, in dependence upon the orientation information.

According to various but not necessarily all examples of the disclosure there is provided a system comprising an apparatus as mentioned above and an image capturing device.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1:
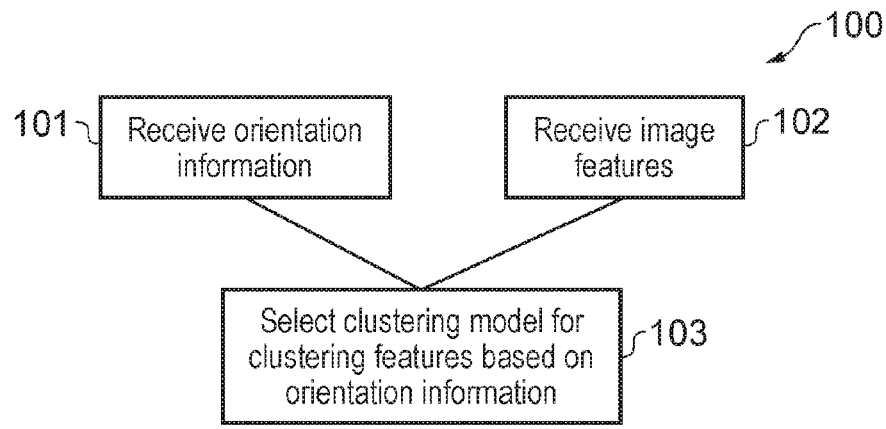
FIG. 1 schematically illustrates a method according to the present disclosure.

The Figures are not necessarily to scale. Certain features and views of the figures may be shown schematically or exaggerated in scale in the interest of clarity and conciseness.

DETAILED DESCRIPTION

Examples of a method, apparatus, computer program and system for image analysis according to the present disclosure will now be described with reference to the Figures. Similar reference numerals are used in the Figures to designate similar features where appropriate. For clarity, all reference numerals are not necessarily displayed in all figures. The examples of the present disclosure and the accompanying claims may be suitably combined in any manner apparent to one of ordinary skill in the art.

FIG. 1 schematically illustrates a flow chart of a method 100 comprising causing, at least in part, actions that result in:

receiving 101 orientation information of an image capturing device;

receiving 102 one or more features detected from an image captured by the image capturing device; and selecting 103 a clustering model for clustering the features, wherein the clustering model is selected, at least in part, in dependence upon the orientation information.

The component blocks of FIG. 1 are functional and the functions may be performed by an apparatus 400 such as discussed below with reference to FIG. 4.

The method 100 may be a computer vision method for determining semantic information from the image for classifying the image.

In block 101 of the method 100, orientation information of an image capturing device is received. The orientation information is information related to an orientation of the image capturing device, for example a value or an indication of the orientation of the image capture device at time of capturing an image such that the orientation information is captured substantially instantaneously with the capturing of the image. The orientation information may comprise: yaw, pitch and roll angles of the image capture device. In some examples it may correspond to panning and tilting of the image capture device. In some examples orientation information may relate to a vertical (tilt) angle of the image capture device's optical axis relative to a horizontal plane. Such orientation information may be derived from auxiliary sensors of the image capturing device, e.g. accelerometers, gyroscopes, compass, magnetometer or other sensors for measuring an orientation.

The image capturing device is a device configured to capture an image. It may be, for example, a CCD sensor, a camera, a video recorder or other means for capturing/recording an image. The image itself may be visual data, e.g. a still image, such as photo or a frame of video or a region thereof. In some examples, the image may comprise a moving image such as video. In some examples, the image could be part of audio visual data, e.g. an audio visual recording such as a video with sound.

In block 102, one or more features detected from an image captured by the image capturing device is received. The features may, for example, relate to a description of a small distinctive region of the image e.g. corners, edges, blobs, ridges or interest points. The features may correspond to feature points detected and extracted from the image. The features may be detected by a feature detector that is configured to detect and describe local features in the image. Such a feature detector may comprise, not least for example: a scale-invariant feature transform (SIFT) algorithm, or a speeded up robust features (SURF) algorithm or a histogram of oriented gradients (HOG) based algorithm.

In block 103, a clustering model for clustering the features is selected, at least in part, in dependence upon the orientation information. For example, there may be a plurality of clustering models to choose from, wherein each clustering model is associated with a particular range of angles of orientation of the image capturing device, a clustering model may be selected that is associated with the value of the orientation of the image capturing device.

The clustering model may comprise a particular set of clusters against which the features of the image are mapped, thereby clustering the features of the image into the various particular clusters of the clustering model. The set of clusters may be a learnt set of clusters trained on a particular image set. In some examples, the clustering model is a particular 'bag of visual words' (BOVW) model which may have been trained on a particular image set. The set of clusters or "visual words" of the clustering model may be analogous to "words" in the standard 'bag of words' (BOW) technique. The clustering model may be used to cluster the features. For example, the features are mapped into the set of clusters. In some examples, the clustering model may be configured to receive, as input, features detected and extracted from the image and, as an output, cluster the features together, for example into K clusters.

Each clustering model may be optimised for its respective angle range, e.g. trained on a set of images (and/or image regions) that are appropriate for its respective angle range and/or captured at orientation angles corresponding to the model's associated angle range. By way of an example, a clustering model to be selected for tilt angles from 45° to 90° with respect to the horizontal plane may be trained on images of scenes/objects taken by an image capturing device pointing upwards, e.g. images (or sections of images) that are predominantly of skies/ceilings. Such a clustering model would thereby be trained to comprise sets of clusters related to features points typically found in images of scenes/objects captured at tilt angles from 45 to 90°, i.e. feature points from a particular orientation/direction.

Without limiting the scope of the claims, an advantage/technical effect of some examples of the present disclosure may be to aid the clustering of features for image analysis, by providing improved control of the selection of a clustering model to use. This may enable a reduction in the computational complexity of the clustering process, which may thereby provide a more efficient method of image analysis and classification, as well as enhanced derivation of semantic information from an image.

Following the selection of the clustering model, the features may be clustered using the selected clustering model and the clustered features may be used to determine semantic information from the image for classifying the image (not shown). Such additional features are described in further detail below with reference to the method 200 of FIG. 2.

By way of a non-limiting example, a first clustering model may be provided that is optimised for use with images captured at an orientation/vertical tilt angle ranging from 45° to 90° (for example the first clustering model may have been trained on images of skies/ceilings). A second clustering model may be provided that is optimised for use with captured images having tilt angles of −45° to +45° (for example the second clustering model may have been trained on images of landscapes/rooms) and a third clustering model may be provided for use with images having tilt angles of −45° to −90° (for example the third clustering model may have been trained on images of the ground/floors). The selection of which clustering model to use may be based on which clustering model is associated with a tilt value range which encompasses the value of the tilt angle of the image capturing device when it captured the image.

If one were to envisage a scenario wherein the image capturing device, i.e. camera, were aimed directly vertically upwards, i.e. having a tilt angle of 90° relative to the horizontal, this would mean that the first clustering model would be selected for clustering the detected features. Thus examples of the invention may provide improved selection of a clustering model for clustering features of an image by enabling the dynamic adjustment/selection of a clustering model based on the orientation of the image capturing device when it captured the image.

With reference to such an example, if one were to envisage a scenario where an image is captured by a camera aiming directly upwards, the features of the image may be clustered by a particular clustering model dependent on the camera orientation. Such a clustering model selected may be optimised/focused for clustering features of such upwardly aiming images. Thus, such an example may provide improved and more efficient clustering of features by enabling the selection of a clustering model, dependent on the camera orientation that may be configured/optimised for the orientation of the image captured. Thus, various examples may enable an optimally appropriate clustering model to be selected and used for the image/each region of the image. This may enable enhanced clustering and/or a less computationally intensive clustering process to be performed.

Figure 2:
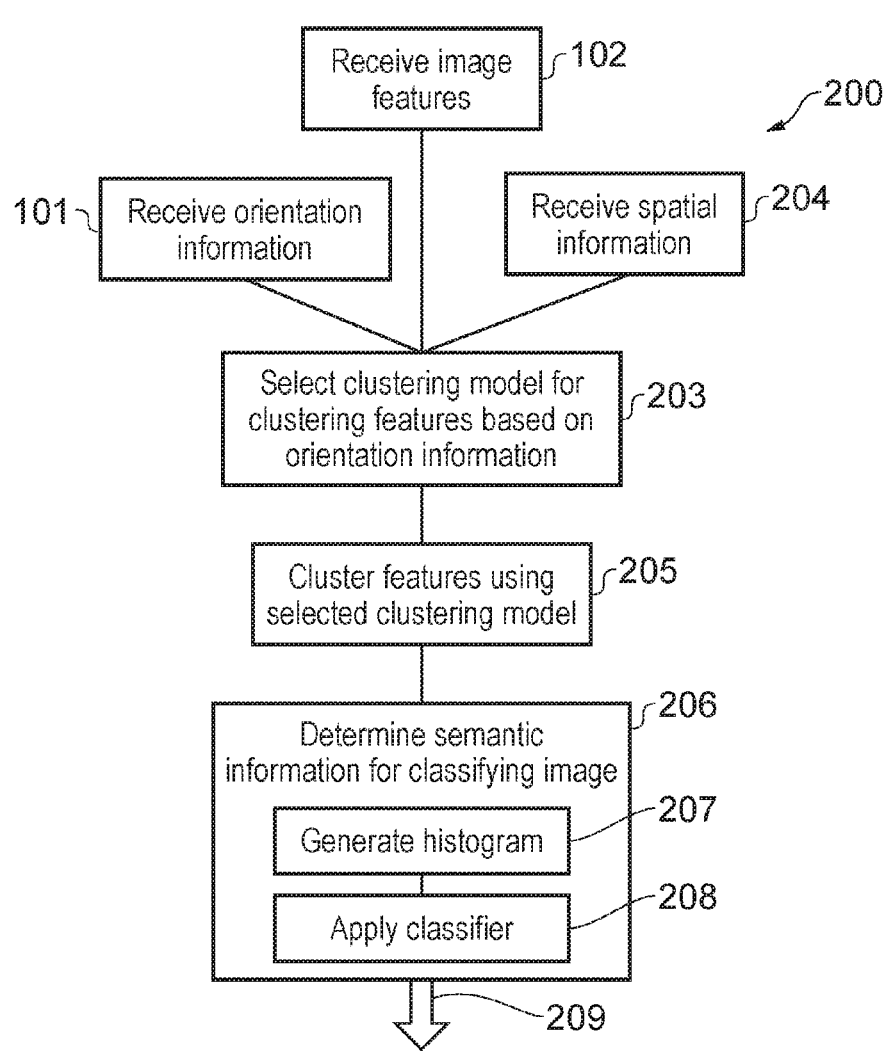
FIG. 2 schematically illustrates a further method according to the present disclosure.

FIG. 2 schematically illustrates a flow chart of a further method 200. The flowchart is of one possible scenario among others. In certain other examples one or more blocks may be performed in a different order or overlapping in time, in series or in parallel. One or more blocks may be omitted or added or changed in some combination of ways.

Blocks 101 and 102 of the method 200 are similar to those of block 101 and 102 of FIG. 1. In block 204, for each of the one or more features received in block 102, spatial information related to a location of each feature within the image is received. Such spatial information may comprise positional information of the feature within the image, e.g. x,y coordinates or pixel location of the feature within the image.

Block 203 is similar to that of block 103, in that a clustering model is selected in dependence upon the orientation information received in block 101. However, in block 203, the selection of the cluster model is further dependent upon the spatial information. For example, the selection of the classification model may be dependent upon a relationship between the orientation information and the spatial location (as will be discussed further below with reference to FIGS. 6A, 6B and 7).

In block 205, the features are clustered using the selected clustering model. In some examples, this may entail applying an algorithm that employs the selected clustering model to map each of the features of block 102 to one of the clusters of the set of clusters of the clustering model.

The clustered features may subsequently be used in the classifying of the image. In block 206, semantic information is determined from the clustered features. Such a determination may comprise generating a histogram as shown in block 207. The histogram may relate to the frequency of the occurrence of the various clustered features output from block 205.

In block 208, the histogram is inputted into a classifier which determines semantic information. The classifier may comprise a classifying algorithm such as a support vector machine (SVM) algorithm, or a trained SVM model.

The determined semantic information 209 derived/extracted from the image may, for example, classify the image content into a type of scene imaged (not least for example: landscape, portrait), a type of action/activity imaged (not least for example sport type classification), objects detected, and categorization according to the type of image, such as: vacations, travels, family, friends, etc.

Such semantic information descriptive of the image content may be represented by metadata associated with the image and may be used not least, for example, to: identify, reference, sort, organise, index, retrieve and classifying the image.

In some examples, a "Bag of Visual Words" (BOVW) technique is used for the image analysis. In which case, the classifying model is a particular BOVW model (e.g. a BOVW model trained on a particular set of training images to provide a set of clusters that correspond to "visual words"). In some examples, the BOVW model is configured to receive as an input features detected and extracted from an image (or image region). The feature points are mapped to the clusters of the BOVW model and a histogram is generated and output which represents how many visual words (modelled by the BOVW model) occur based on the inputted features.

The histogram generated may be a histogram of the visual words of the image. Such a histogram may itself be used as an input into a classifier/classifying algorithm using a trained classification model, which enables the image to be classified by determining semantic information based on the histogram.

Figure 3:
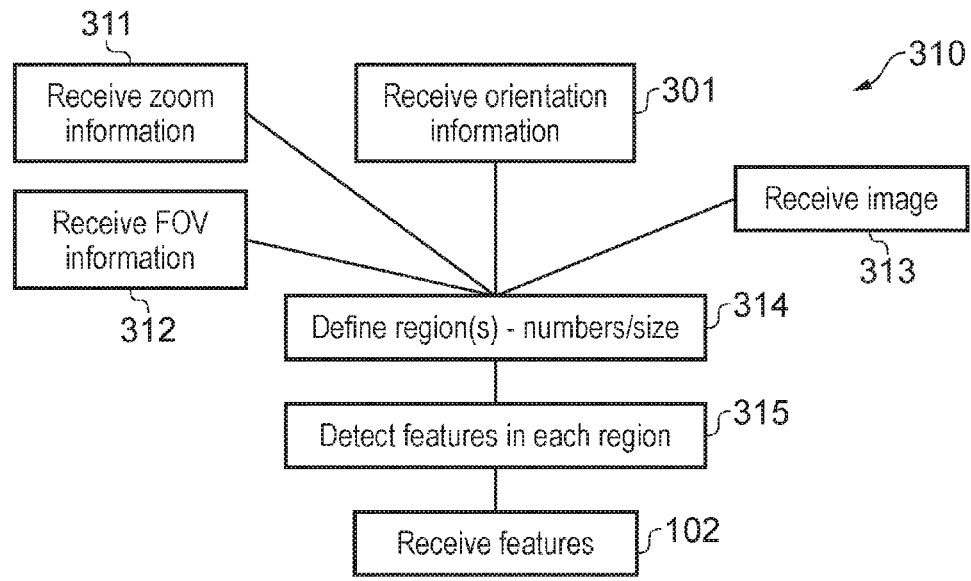
FIG. 3 schematically illustrates a yet further method according to the present disclosure.

FIG. 3 schematically illustrates a flow chart of a yet further method 310 for detecting features, and in particular detecting features from a particular region of the image.

In block 301 orientation information is received. In blocks 311 and 312 zoom information and field of view (FOV) information of the image capturing device is received respectively. Such information may correspond to a parameter or an indication as to a quantisation of the zoom level and FOV respectively of the image capturing device at the time of capturing the image. In block 313 the image captured by the image capturing device is received. In block 314, one or more regions of the image are defined, wherein such definition is dependent on one of more of:

the received orientation information,
the received zoom information, and
the received FOV information.

For example, the number of regions that are defined may be based on one or more of a), b) and c). The size of each region that is defined may be based on one or more of a), b) and c).

In block 315, one or more features are detected and extracted from each defined region. A feature detector employing, for example, a scale-invariant feature transform (SIFT) algorithm, or a speeded up robust features (SURF) algorithm may be employed in this regard. The detected features from each defined region may then be received in block 102 (and then used in the methods of FIGS. 1 and 2). For example, the features from a particular region may be clustered using a clustering model, wherein the clustering model is dependent upon the orientation information, as per blocks 101-103.

In some examples, a plurality of clustering models may be provided, wherein each clustering model is associated with at least one region, such that features from a particular region are clustered via the cluster model associated with the region. The association of a cluster model with a region may be dependent upon the orientation information. It will be appreciated that such an association of a cluster model with a region, in effect, corresponds to the selection of a clustering model based on both the orientation information and also the spatial information of a detected feature (i.e. wherein the spatial information is used to determine which region a detected feature is in). Such examples enable a dynamic adjustment of the classification model used/associated with a particular region in dependence upon the orientation information.

In some examples, only one region may be associated with a clustering model, but one or more clustering models may be associated with each region.

Examples of the present disclosure may take the form of a method, an apparatus, a computer program or a system. Accordingly, examples may be implemented in hardware, software or a combination of hardware and software.

Certain examples of the present disclosure have been described above using flowchart illustrations and schematic block diagrams. It will be understood that each block, and combinations of blocks, can be implemented by computer program instructions of a computer program. These program instructions may be provided to one or more processor(s), processing circuitry or controller(s) such that the instructions which execute on the same create means for causing implementing the functions specified in the block or blocks. The computer program instructions may be executed by the processor(s) to cause a series of operational steps/actions to be performed by the processor(s) to produce a computer implemented process such that the instructions which execute on the processor(s) provide steps for implementing the functions specified in the block or blocks.

It will be understood that each block and combinations of blocks, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory storage device and performed by a processor.

As will be appreciated, any such computer program instructions may be loaded onto a computer or other programmable apparatus (i.e., hardware) to produce a machine, such that the instructions when performed on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational actions to be performed on the programmable apparatus to produce a computer-implemented process such that the instructions which are performed on the programmable apparatus provide actions for implementing the functions specified in the blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Figure 4:
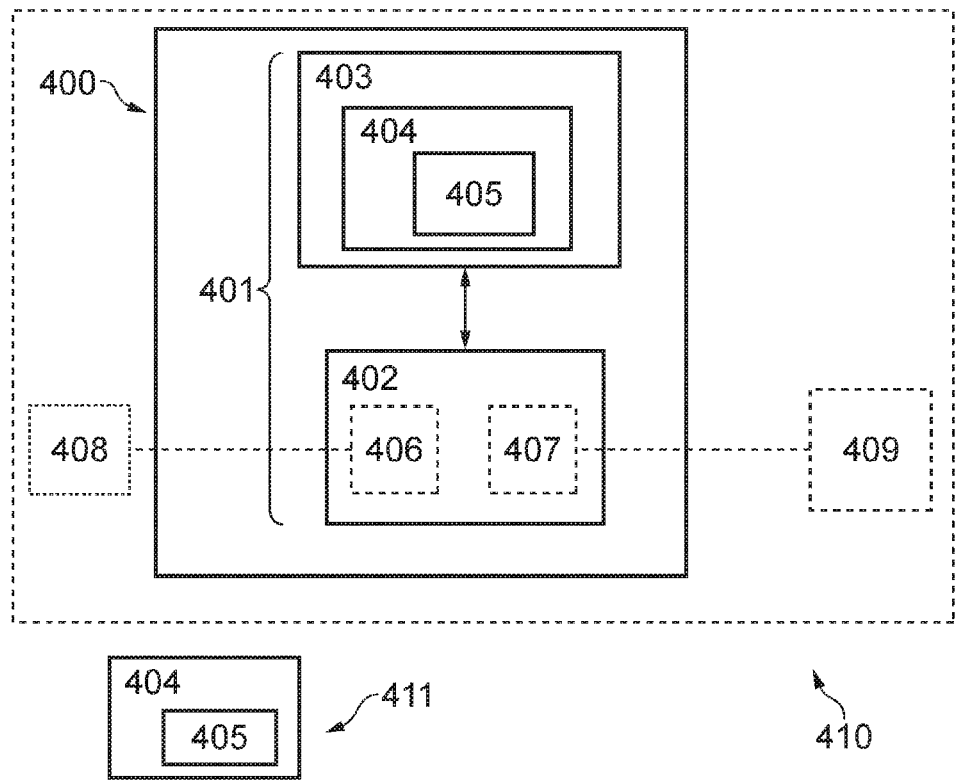
FIG. 4 schematically illustrates an apparatus according to the present disclosure.

FIG. 4 schematically illustrates an apparatus 400 comprising means configured to cause the apparatus at least to perform the method as described above.

The apparatus 400 comprises a controller 401. Implementation of the controller 401 can be in hardware alone (for example processing circuitry comprising one or more processors and memory circuitry comprising one or more memory elements), have certain aspects in software including firmware alone or can be a combination of hardware and software (including firmware).

The controller 401 may be implemented using instructions that enable hardware functionality, for example, by using executable computer program instructions in a general-purpose or special-purpose processor that may be stored on a computer readable storage medium (disk, memory etc) or carried by a signal carrier to be performed by such a processor.

In the illustrated example, the apparatus 400 comprises a controller 401 which is provided by a processor 402 and memory 403. Although a single processor and a single memory are illustrated in other implementations there may be multiple processors and/or there may be multiple memories some or all of which may be integrated/removable and/or may provide permanent/semi-permanent/dynamic/cached storage.

The memory 403 stores a computer program 404 comprising computer program instructions 405 that control the operation of the apparatus when loaded into the processor 402. The computer program instructions provide the logic and routines that enable the apparatus to perform the methods presently described.

The at least one memory 403 and the computer program instructions 405 are configured to, with the at least one processor 402, cause the apparatus 400 at least to perform the methods presently described, for example not least with respect to FIGS. 1, 2 and 3.

The processor 402 is configured to read from and write to the memory 403. The processor 402 may also comprise an input interface 406 via which data (not least for example one or more of: the features, the orientation information, the spatial information, the image, the zoom and FOV information, the clustered features, the histograms) and/or commands are input to the processor 402, and an output interface 407 via which data (not least for example one or more of: the clustered features, the histograms and semantic/classification information) and/or commands are output by the processor 402.

The apparatus 400 may, for example, be: a user equipment device, a client device, a server or a module or chipset for use in any of the same.

Additional modules 408 may be provided for obtaining/generating the requisite information/data for inputting to the processor. For example, the additional modules 408 may correspond to: an image sensor, an orientation sensor, zoom FOV sensor or feature detector. In some examples one or more of such modules may be separate from/external to the apparatus and housed in a separate device. In some examples one or more of such modules may be provided with the apparatus in a single device 410. Such a device may correspond to an image capturing device with auxiliary sensors for detecting orientation and a feature detector for detecting features of captured images. Likewise additional modules 409 may be provided for receiving the information/data outputted from the processor (e.g. not least for example a display or storage). Such additional modules 409 may be embodied with the apparatus or provided separately of the apparatus.

The computer program may arrive at the apparatus 400 via any suitable delivery mechanism 411. The delivery mechanism 411 may be, for example, a non-transitory computer-readable storage medium, a computer program product, a memory device, a record medium such as a compact disc read-only memory, or digital versatile disc, or an article of manufacture that tangibly embodies the computer program 404. The delivery mechanism may be a signal configured to reliably transfer the computer program 404. The apparatus 400 may receive, propagate or transmit the computer program 404 as a computer data signal.

The apparatus may be provided in an electronic device, for example, mobile terminal, according to an exemplary embodiment of the present disclosure. It should be understood, however, that a mobile terminal is merely illustrative of an electronic device that would benefit from examples of or implementations of the present disclosure and, therefore, should not be taken to limit the scope of the present disclosure to the same. While certain in certain implementation examples the apparatus may be provided in a mobile terminal, other types of electronic devices may readily employ examples of the present disclosure regardless of their intent to provide mobility.

The apparatus 400 may be embodied in a camera, video recorder, hand held portable electronic device, such as a mobile telephone, a wireless communications device, a wearable computing device or a personal digital assistant, that may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

The apparatus may be provided in a module. As used here 'module' refers to a unit or apparatus that excludes certain parts/components that would be added by an end manufacturer or a user.

Figure 5:
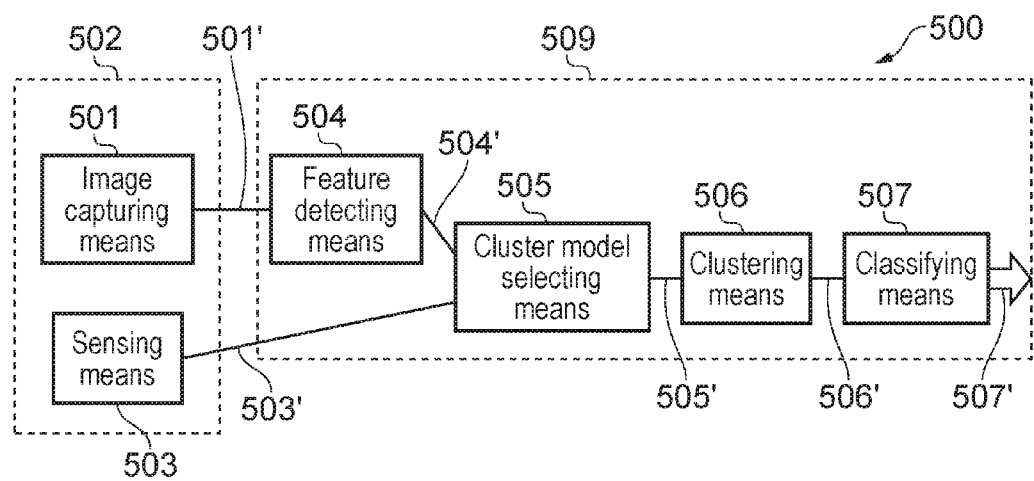
FIG. 5 schematically illustrates a system according to the present disclosure.

FIG. 5 schematically illustrates a system 500 comprising various means/modules configured to provide the functionality of the presently described methods.

The system 500 comprises:
an image capturing means/module 501 configured to capture an image 501', e.g. via an image sensor of an image capture device 502. The image is provided to a feature detecting means 504 discussed below.

sensing/detecting means/module 503 configured to obtain/generate information 503' such as: orientation, zoom level and FOV information of the image capturing means/module 501 or other information describing aspects of the capturing process, e.g. via one or more auxiliary sensors of the image capturing device 502. Such auxiliary sensor information 503' is provided to a means 505 for selecting a cluster model;

a feature detecting means/module 504 configured to detect features 504' from the received image 501'. This may comprise the application of a feature detection algorithm as previously described. The feature detecting means/module 504 may also determine spatial information of the features and output the same to the means 505 for selecting a cluster model;

means/module 505 configured to select a clustering model 505' as previously described, i.e. not least in dependence on the orientation information 503';

means/module 506 configured to cluster the features using the selected clustering model 505';

means/module 507 configured to determine semantic information 507' using the clustered features 506'. This may comprise the generation of a histogram of the clustered features 506' and the application of a classification algorithm on the histogram as previously described. The determined semantic information 507' may be associated with the image, e.g. stored as metadata for the image, and be used to classify the image.

Although examples of the apparatus and system have been described above in terms of comprising various means/modules or components, it should be understood that the various means/modules components may be embodied as or otherwise controlled by a corresponding controller or circuitry such as one or more processing elements or processors of the apparatus, i.e. similar to that of FIG. 4. In this regard, each of the various means/modules components described above may be one or more of any device, means or circuitry embodied in hardware, software or a combination of hardware and software that is configured to perform the corresponding functions of methods described above.

The various means/modules of FIG. 5 may be comprised in separate devices. One or more of the means/modules may be combined in a single device, or all the modules may be provided in the same device. For example, the image capturing means/module 501 and the sensing/detecting means/module 503 may be comprised in the image capturing device 502, with the other means/modules being comprised in one or more distributed servers 509. Alternatively, in some examples, all of the means/modules may be provided in a single device, such as an image capturing device.

Figure 6A:
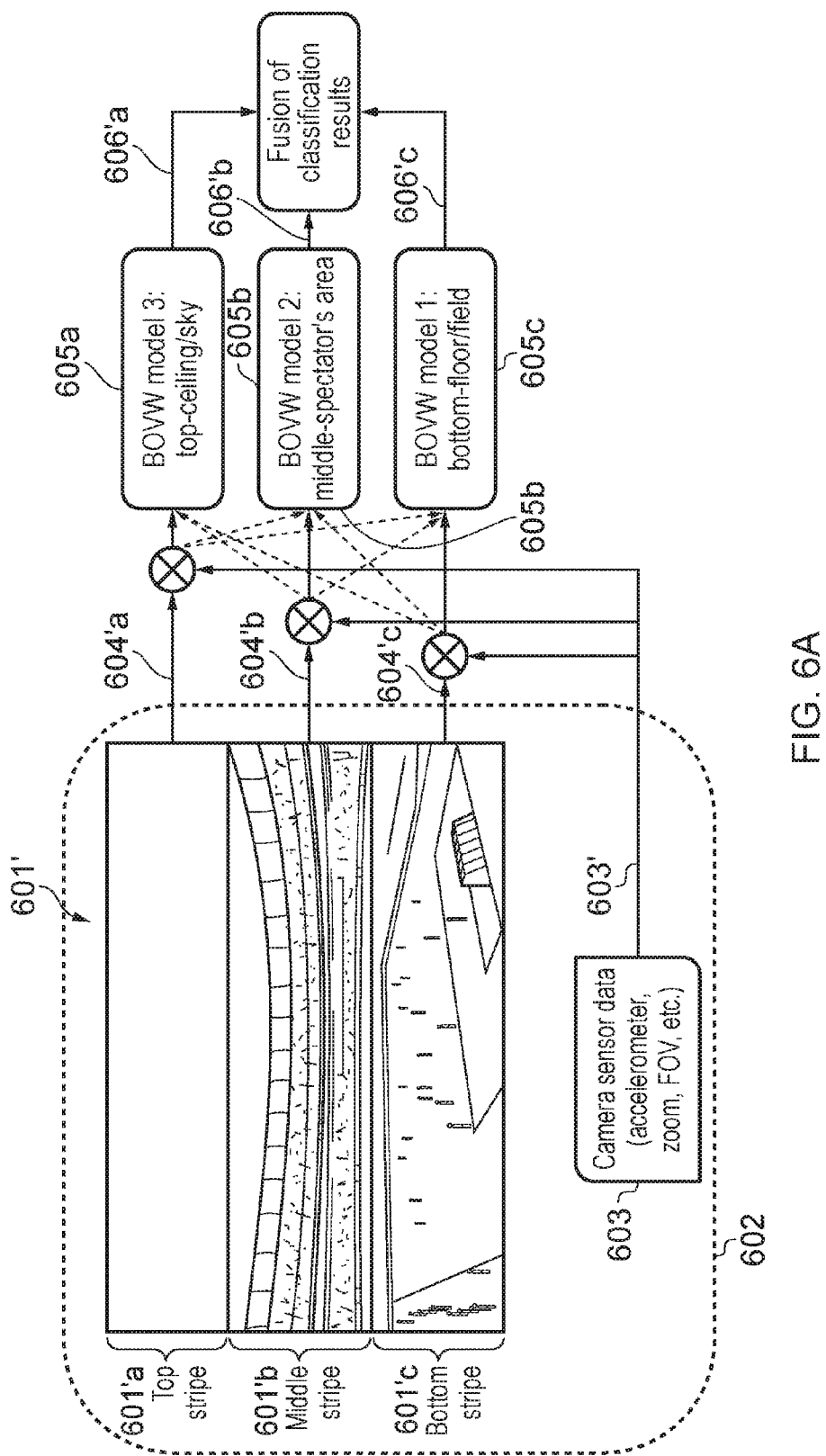
FIGS. 6A and 6B schematically illustrate an example of operation of a method according to the present disclosure.
Figure 6B:
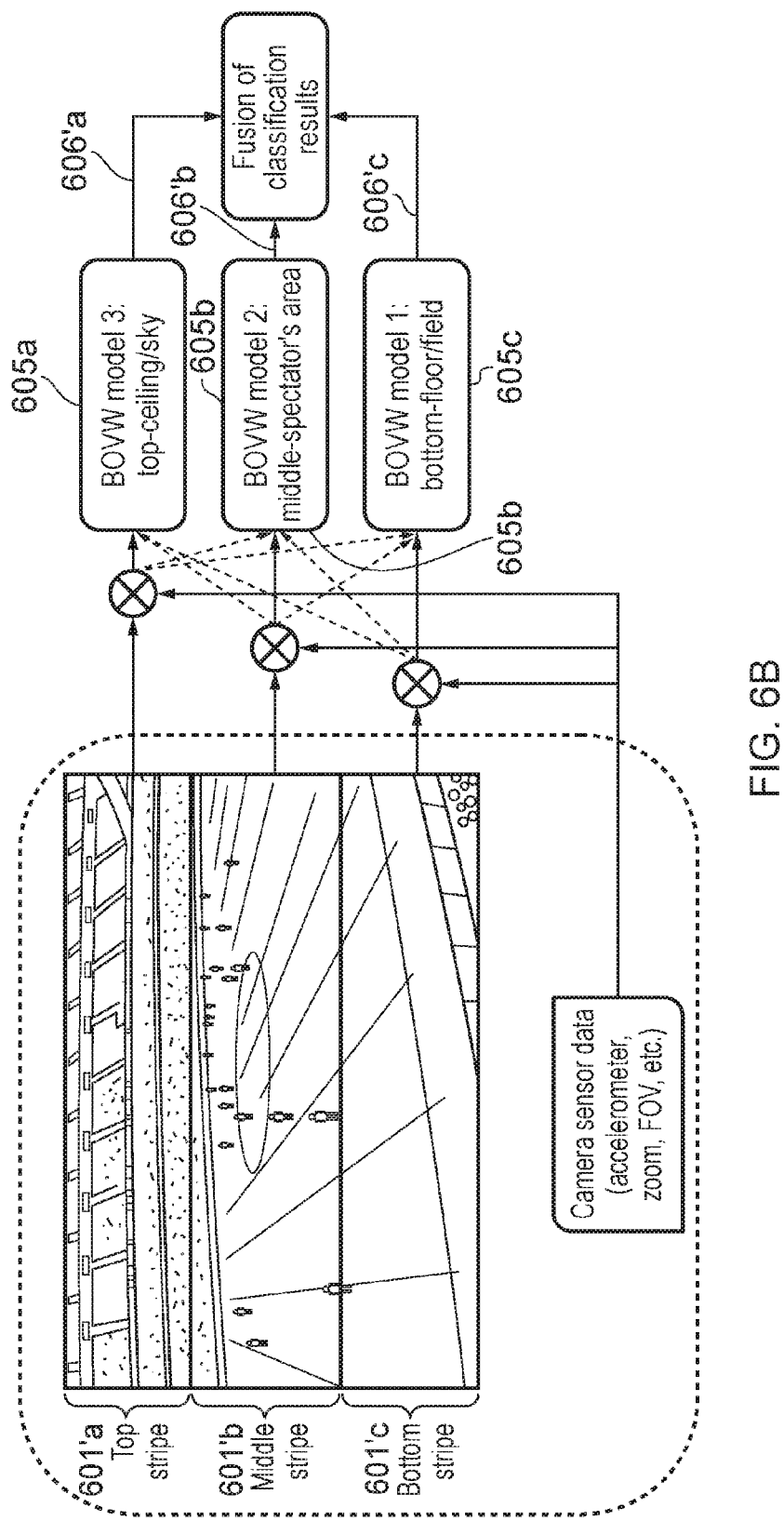

FIGS. 6A and 6B schematically illustrate an example of an image (of a football match) captured at horizontal camera orientation and a downwards orientation respectively. These figures also show the corresponding association between image regions and BOVW models.

In the example of FIGS. 6A and 6B, information about a current/instantaneous vertical orientation of a camera 602 with respect to a horizontal plane (also known as tilt orientation) is used to select a BOVW model 605a-c to use. This information can be provided by auxiliary sensors 603 embedded in the camera, such as accelerometers or gyroscopes.

The camera 602 captures an image 601'. Auxiliary camera sensors 603 additionally capture sensor data to enable a determination of orientation information, such that the image 601' (or frame if considering videos) has a camera orientation associated with it.

The image 601' may be split into N (where N>1) fixed regions of equal or predetermined sizes. In this example the image in split into 3 stripes 601'a-c. Naturally, it will be appreciated that the image may be split into fewer or greater number of regions, which may be of differing size (e.g. as discussed with reference to FIG. 7) also the regions need not necessarily be stripe shaped.

Features from each region are detected, extracted and inputted to one of the N BOVW models, wherein the BOVW model selected for a given region is dependent on the orientation information 603' from the auxiliary sensors 603. Thus, each stripe 601'a-c may be dynamically associated to a specific BOVW model 605a-c depending on the current camera orientation. By this process, the feature points extracted from the whole image are sent to separate BOVW models depending on the relation between their spatial location within the image (i.e., in this example, which region they are in) and the vertical orientation (tilting) of the camera with respect to the horizontal plane.

In the example of FIGS. 6A and 6B, e.g. in the case of sport classification, N=3 models can be used, which would represent a BOVW model configured/optimised for clustering features from images of:
- the floor/field,
- the spectators' area, and
- the ceiling/sky.

Each of the N stripes 601'a-c can be associated to only one of the N BOVW models 605a-c. But a certain BOVW model can be associated to more than one stripe. The specific BOVW model which is associated to a stripe depends on the camera orientation.

With reference to FIG. 6A, in the case of sport classification, if the camera was in perfect horizontal orientation (0 degrees tilt angle from the horizontal plane), the 3 stripes would represent floor/field, spectators' area, and ceiling/sky (from bottom, middle to top of the image respectively). In this case, the feature points extracted from bottom, middle and top stripes would be sent as inputs to the floor/field BOVW model, spectators' area BOVW model and ceiling/sky BOVW model, respectively.

By contrast, with reference to FIG. 6B, if the camera were tilted down slightly (thus capturing/recording mainly the field and also the spectators), the bottom and the middle stripes 601'b-c would represent the field. Based on the orientation, i.e. a negative tilt angle, the field BOVW model may be selected for each of the bottom and middle stripes 601'b-c such that feature points extracted from these stripes would be sent as input to the field BOVW model 1 605c. The BOVW model 2 605b may be selected for the top stripe. In this example, the BOVW model 3 605a is not used for any stripes, thereby avoiding using a BOVW model that is inappropriate for the region whose features are to be clustered and classified. Thus this may provide a more efficient and improved clustering and classification method for image analysis.

If the camera were tilted down yet further towards the floor (not shown), all 3 stripes would represent the floor/field. In this case, the floor/field BOVW model 1 605c may be selected such that feature points extracted from all 3 stripes 601'a-c are sent as input to the floor/field BOVW model 1 605c.

Conversely, if the camera were tilted directly upwards to a tilt angle of 90° (not shown), all 3 stripes 601'a-c would represent the ceiling/sky. In this case, the ceiling/sky BOVW model 3 605a may be selected such that the feature points extracted from all stripes 601'a-c would be sent as input to the ceiling/sky BOVW model 3 605a.

The feature points extracted from a given region 601'a-c are sent to selected particular BOVW model 605a-c depending on the relation between the features' spatial location within the image (e.g. which region they are located in) and the tilt angle of the camera with respect to the horizontal plane. This relation may be initially learned offline from training data.

The output from each of the BOVM models 606'a-c may be a corresponding BOVM histogram. The BOVM histograms output from each BOVM model may be combined, for example by early fusion or late fusion. In early fusion, the histograms are first combined (for example by concatenation), then the resulting histogram is input to a classifier (e.g., SVM). In late fusion, the histograms are separately input to two classifiers (e.g., SVMs), and then the classifiers' outputs are combined by a combination rule or by a meta-level classifier.

Using the above described method, semantic information may be derived/extracted from the image, i.e. a list of various words/"classifications" attributable to the image, e.g. scene=football match, activity occurring=football, objects present=grass, pitch, players, spectators . . . .

Figure 7:
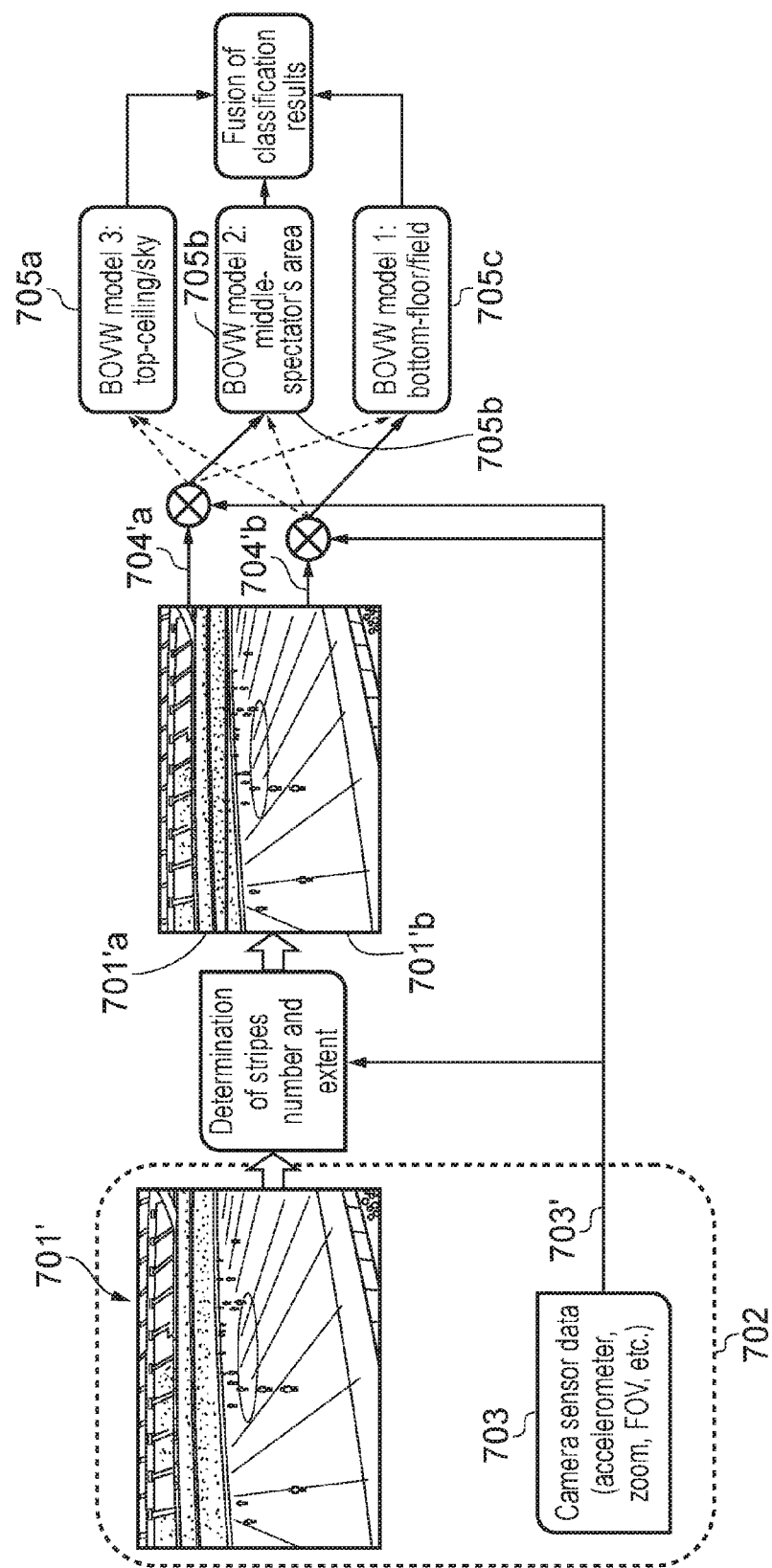
FIG. 7 schematically illustrates another example of operation of a method according to the present disclosure.

FIG. 7 schematically illustrates another example in which the number and size of each stripe is dependent on the camera orientation.

The camera 702 captures an image 701'. Auxiliary camera sensors 703 additionally capture sensor data 703' to enable a determination of orientation information, such that the image (or frame if considering videos) has a camera orientation associated with it. In this example, the image is captured at a downwards orientation, i.e. a negative tilt angle.

The image 701' is split into N variable regions, wherein the number of regions and the size of each region is dependent upon the camera orientation. In this example camera is tilted slightly downwards, responsive to which the image is split into 2 stripes 701'a-b. Also, the bottom stripe 701'b has been given higher spatial extent than the top stripe 701'a. Furthermore, based on the camera orientation 703', the BOVW model 2 705b is selected for the top stripe 701'a and the BOVW model 1 705c is selected for the lower stripe 701'b (the BOVW model 3 705a has not been selected for any strips with the camera's negative tilt angle orientation).

The camera orientation 703' controls both the image stripes (e.g. their number and extent), and also the association between stripes 701'a-b and BOVW models 705a-c, i.e. which BOVW model 705a-c to use to cluster the features 704'a, 704'b for a given stripe 701'a, 701'b. Thus, the determination of the number of stripes and their size, as well as the BOVW model to be selected are all dependent upon the camera's orientation.

In the present disclosure, references to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Examples of the present disclosure provide both a method and corresponding apparatus comprising various modules, means or circuitry that provide the functionality for performing the actions of the method. The modules, means or circuitry may be implemented as hardware, or may be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

Features described in the preceding description may be used in combinations other than the combinations explicitly described. Although functions have been described with reference to certain features, those functions may be performable by other features whether described or not. Although features have been described with reference to certain examples, those features may also be present in other examples whether described or not. Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise.

In the above description, the apparatus described may alternatively or in addition comprise an apparatus which in some other embodiments comprises a distributed system of apparatus, for example, a client/server apparatus system. In examples of embodiments where an apparatus provided forms (or a method is implemented as) a distributed system, each apparatus forming a component and/or part of the system provides (or implements) one or more features which collectively implement an example of the present disclosure. In some examples of embodiments, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

I claim:

1. A method comprising causing, at least in part, actions that result in:
   receiving orientation information from an auxiliary sensor of an image capturing device that captures the orientation information concurrent with capture of an image, wherein the orientation information comprises an indication of an orientation of the image capturing device upon capturing the image;
   receiving one or more features detected from different regions of the image captured by the image capturing device; and
   for each of the different regions, selecting a clustering model for clustering the features, wherein the clustering model is, at least in part, in dependence upon the orientation information such that different clustering models are selected for at least two different regions based, at least in part, upon the orientation information from the image capturing device, and wherein the clustering model is associated with a respective range of angles and is trained on a set of images captured at orientation angles corresponding to the respective range of angles.

2. The method of claim 1, further comprising clustering the one or more features using the selected clustering model.

3. The method of claim 2, further comprising using the clustered features to determine semantic information from the image for classifying the image.

4. The method of claim 1, wherein the clustering model is a bag of visual words model.

5. The method of claim 1, further comprising:
   receiving, for each of the one or more features, spatial information related to a location of the feature within the image; and wherein the selection of the clustering model for each of the one or more features is further dependent upon the spatial information.

6. The method of claim 1, further comprising defining a number of regions of the image, wherein the number of regions defined depends on one or more of:

the orientation information;

a zoom level of the image capture device; and a field of view of the image capture device.

7. The method of claim 1, further comprising defining one or more regions of the image, wherein the size of each of the one or more regions depends on one or more of:

the orientation information;

a zoom level of the image capture device; and a field of view of the image capture device.

8. The method of claim 7, wherein receiving the one or more features detected from the image comprises receiving one or more features detected from a particular region of the image.

9. The method of claim 8, wherein clustering the one or more features using the selected clustering model comprises clustering the one or more features detected from a particular region of the image.

10. An apparatus, comprising:

at least one processor; and at least one memory including computer program code, the memory and the computer program code configured to, working with the processor, cause the apparatus to perform at least the following:

receive orientation information from an auxiliary sensor of an image capturing device that captures the orientation information concurrent with capture of an image, wherein the orientation information comprises an indication of an orientation of the image capturing device upon capturing the image;

receive one or more features detected from different regions of the image captured by the image capturing device; and for each of the different regions, select a clustering model for clustering the features, wherein the clustering model is selected, at least in part, in dependence upon the orientation information such that different clustering models are selected for at least two different regions based, at least in part, upon the orientation information from the image capturing device, and wherein the clustering model is associated with a respective range of angles and is trained on a set of images captured at orientation angles corresponding to the respective range of angles.

11. An apparatus of claim 10, further comprising clustering the one or more features using the selected clustering model.

12. An apparatus of claim 11, further comprising using the clustered features to determine semantic information from the image for classifying the image.

13. An apparatus of claim 10, wherein the clustering model is a bag of visual words model.

14. An apparatus of claim 10, further comprising:

receiving, for each of the one or more features, spatial information related to a location of the feature within the image; and wherein the selection of the clustering model for each of the one or more features is further dependent upon the spatial information.

15. An apparatus of claim 10, further comprising defining a number of regions of the image, wherein the number of regions defined depends on one or more of:

the orientation information;

a zoom level of the image capture device; and a field of view of the image capture device.

16. An apparatus of claim 10, further comprising defining one or more regions of the image, wherein the size of each of the one or more regions depends on one or more of:

the orientation information;

a zoom level of the image capture device; and a field of view of the image capture device.

17. An apparatus of claim 16, wherein receiving the one or more features detected from the image comprises receiving one or more features detected from a particular region of the image.

18. An apparatus of claim 17, wherein clustering the one or more features using the selected clustering model comprises clustering the one or more features detected from a particular region of the image.

19. At least one non-transitory computer-readable medium encoded with instructions that, when executed by a processor, perform:

receiving orientation information from an auxiliary sensor of an image capturing device that captures the orientation information concurrent with capture of an image, wherein the orientation information comprises an indication of an orientation of the image capturing device upon capturing the image;

receiving one or more features detected from different regions of the image captured by the image capturing device; and for each of the different regions, selecting a clustering model for clustering the features, wherein the clustering model is selected, at least in part, in dependence upon the orientation information such that different clustering models are selected for at least two different regions based, at least in part, upon the orientation information from the image capturing device, and wherein the clustering model is associated with a respective range of angles and is trained on a set of images captured at orientation angles corresponding to the respective range of angles.

20. The medium of claim 19, further encoded with instructions that, when executed by a processor, perform clustering the one or more features using the selected clustering model.

* * * * *

UNITED STATES PATENT AND TRADEMARK OFFICE
CERTIFICATE OF CORRECTION

Page 1 of 1

PATENT NO. : 9,946,957 B2
APPLICATION NO. : 15/185550
DATED : April 17, 2018
INVENTOR(S) : Cricri It is certified that error appears in the above-identified patent and that said Letters Patent is hereby corrected as shown below:

On the Title Page

Item (72) Inventor: "Tampere, FL (US)" should read --Tampere (FI)--.

Signed and Sealed this
Thirtieth Day of October, 2018

Andrei Iancu
*Director of the United States Patent and Trademark Office*